(12) United States Patent
Prigent

(10) Patent No.: US 8,625,919 B2
(45) Date of Patent: Jan. 7, 2014

(54) METHOD OF RECORDING IMAGES AND DATA FOR RETRIEVING THESE IMAGES

(76) Inventor: Thierry Prigent, Sainte Hélène (FR)

( * ) Notice: Subject to any disclaimer, the term of this patent is extended or adjusted under 35 U.S.C. 154(b) by 209 days.

(21) Appl. No.: 12/736,881

(22) PCT Filed: May 19, 2009

(86) PCT No.: PCT/FR2009/050930
§ 371 (c)(1),
(2), (4) Date: Apr. 27, 2011

(87) PCT Pub. No.: WO2009/150365
PCT Pub. Date: Dec. 17, 2009

(65) Prior Publication Data
US 2011/0200265 A1    Aug. 18, 2011

(30) Foreign Application Priority Data

May 19, 2008  (FR) ...................................... 08 53215

(51) Int. Cl.
*G06K 9/36*  (2006.01)
(52) U.S. Cl.
USPC .......................................... 382/254; 382/276
(58) Field of Classification Search
None
See application file for complete search history.

(56) References Cited

U.S. PATENT DOCUMENTS

| | | | |
|---|---|---|---|
| 5,818,032 A | 10/1998 | Sun et al. | |
| 6,006,231 A | 12/1999 | Popa | |
| 7,020,327 B2 * | 3/2006 | Tack-don et al. | 382/162 |
| 2002/0191953 A1 | 12/2002 | Fukushima | |
| 2005/0238327 A1 * | 10/2005 | Sugahara et al. | 386/95 |
| 2006/0149998 A1 | 7/2006 | Prigent | |
| 2011/0254885 A1 * | 10/2011 | Prigent et al. | 346/146 |

FOREIGN PATENT DOCUMENTS

FR   2 867 342 A1   9/2005
FR   2 879 312 A1   6/2006

* cited by examiner

*Primary Examiner* — Li Liu
(74) *Attorney, Agent, or Firm* — Jacobson Holman, PLLC

(57) ABSTRACT

According to this method, for the formulation and recording of the retrieval data, each of the images (2) taking the form of a two-dimensional array of rows and columns of pixels, the image is divided into blocks (4) of pixels, each block (4) comprising pixels of at least two rows and two columns, retrieval data are calculated for each block (4) on the basis of at least the image data contained in the pixels of this block (4) and the retrieval data calculated is recorded in the form of at least one pixel (5) exhibiting a value dependent on the retrieval data.

20 Claims, 2 Drawing Sheets

METHOD OF RECORDING IMAGES AND DATA FOR RETRIEVING THESE IMAGES

This is a national stage of PCT/FR09/050930 filed May 19, 2009 and published in French, which has a priority of French no. 0853215 filed May 19, 2008, hereby incorporated by reference.

The present invention relates to a method of recording images and data for retrieving said images, each of them assuming the form of a two-dimensional array of rows and columns of pixels.

The invention also relates to the recording medium resulting from the implementation of this method and a method for retrieving images borne by said recording medium.

French patent application No. 07 58910, hereafter "the aforementioned patent application," filed on Nov. 9, 2007 in this applicant's name, describes a method of recording data for long-term automatic reading of said data, according to which one records, on a same recording medium, on one hand an encoded recording of this data allowing automatic reading thereof and, on the other hand, a recording, with intuitive visual reading, of the knowledge necessary to implement the means for decoding the data, for automatic reading thereof.

This method aims to ensure long-term saving of all types of data, and in particular of "image" data, currently commonly recorded on digital recording media requiring software and material means for reading whereof the useful life is at best several lusters, and therefore incompatible with an aim of long-term saving.

To do this, the aforementioned patent proposes to record such images, for example from a video program, on a long-lasting recording medium, such as a photographic film, these images being recorded in a form adapted to direct human reading such as automatic reading using decoding means reconstructed from intuitive reading information recorded on the same film. Because this is intuitive reading information, it remains accessible for a very long time by readers such as future archivists. It makes it possible to avoid any recourse to past material and software reading means, quickly lost through obsoleteness.

The fact remains, however, that the recording medium itself can, in the very long term, undergo deteriorations due to a slow transformation of its chemical or physico-chemical structure or mechanical accidents such as abrasions, tears, scratches or stains, for example, due to periodic alterations of its storage conditions. These accidents can destroy, at least partially, the very content of the images, on the areas of these damaged images.

Various methods have been proposed for the retrieval, or repair, of damaged images. A first group of methods uses the duplication of the recording of images on a same medium, for example in positions chosen so that the simultaneous deterioration of various recordings of the same image, during a storage accident, is unlikely. The method described in document FR-A-2 867 342 describes such a method. These methods have the drawback of taking up large areas of the recording medium.

Also known from document FR-A-2 879 312 is a method for writing and retrieving data on a photographic support, this data being called "conservation" data because it is intended for long-lasting conservation. This data can be of any type, and in particular the "image" type. For this type of data, recorded in the form of an array of rows and columns of pixels making it possible to read the image with the naked eye, this method proposes to record, for each row and each column, control data similar to the checksums commonly used in computers to certify computation data. This control data, the recording of which does not consume a large surface of the support, makes it possible to easily determine the zones of an image that are damaged and repair them, inasmuch as the surface of such a zone is very small, not exceeding 2×2 pixels. For image zones to be retrieved with a larger surface, the described method proposes to combine the use of such control data with the recording on the support of several sub-samples of pixels of the image, able to enable a retrieval of said zones by interpolations done from pixels taken from these sub-samples. The method then becomes more costly in terms of medium surface dedicated to recording the image and its conservation or retrieval data.

The present invention aims precisely to provide a method of recording images and data for retrieving said images that is able to allow later retrieval of extended zones of such an image, while also minimizing the medium surface dedicated to the recording of said retrieval data.

This aim of the invention is achieved, as well as others that will appear upon reading the following description, with a method of recording images and data for retrieving said images, each of the images assuming the form of a two-dimensional array of rows and columns of pixels, this method being remarkable in that, to develop and record the retrieval data, the image is divided into blocks of pixels, each block comprising pixels of at least two rows and two columns, retrieval data is calculated for each block from at least the image data contained in the pixels of that block, and said retrieval data of the block is recorded in the form of at least one pixel having a value as a function of said retrieval data.

As will be seen in detail later, owing to the division of the image into blocks of pixels and specific processing of the data contained in said blocks, it is possible to concentrate, in an area of a support recording the image, richer retrieval data, with a surface equal to that area. The surface of that area can advantageously be limited as needed. Moreover, the retrieval of images including extended surface deterioration zones becomes possible.

According to other features of the present invention:
the image and the retrieval data are recorded on first and second areas of a recording medium, respectively, said areas being arranged in a predetermined relative position relationship,
to calculate the retrieval data, the convolution integral of the values of the pixels of each block is done with a filtering operator, the extremum is calculated by block, and the retrieval data thus calculated is recorded on the second area in a homologous position of the corresponding block of pixels of the image recorded on the first area,
the filtering operator is chosen such that the second area has an image of element contours homologous to those of elements of the image borne by the first area,
alternatively, to calculate the retrieval data, at least one optical characteristic of the pixels of each of the blocks is measured, said optical characteristics thus measured are added, and at least one pixel having the sum optical characteristic thus calculated is recorded on the second area in a position homologous to that of the block of corresponding pixels of the image recorded on the first area,
alternatively, to calculate the retrieval data, a wavelet transform is applied to said image from measurements of at least one optical characteristic of the pixels of each of said blocks and at least one of the retrieval data images resulting from said transform is recorded, this transform is reiterated on at least one of the images resulting from the first transform and at least one of the images resulting from the second transform is recorded, a plurality of retrieval data images resulting from the wave transform are recorded on a recording medium, also alternatively, the method according to the invention being applied to an image that is part of a sequence of animated images, movement vectors of the homologous blocks of these images are calculated from the content of the blocks of at least two consecutive images of said sequence and the components of these vectors are recorded on a second area, in a position homologous to that of the considered block in the associated image;

weights of terms of a linear combination of blocks are also recorded on the medium making it possible to calculate a replacement block for a damaged block of an image recorded on the medium, simplified expressions of the blocks of an image are also recorded on the medium, and can be substituted for the corresponding block when the calculation of said replacement block is impossible, when the medium is a color photographic recording medium, the recordings of the vectors, weights and simplified expressions of the blocks are distributed in recording layers of different colors of the medium, images of operating instructions of the retrieval data are also recorded on the medium, these operating instructions use visual reading, advantageously intuitive reading, these operating instructions also have automatic reading.

The invention also relates to a medium for recording images resulting from the implementation of said method, including at least one area bearing retrieval data of an image assuming the form of an array of rows and columns of pixels, this retrieval data being recorded in the form of a second array of pixels each having an optical characteristic as a function of retrieval data calculated from image data contained in a block of pixels resulting from the division of the pixilated image.

According to other features of this recording medium:

the image and the retrieval data are recorded on first and second areas of the medium, respectively, these areas being arranged in a predetermined relative position relationship, the area of the surface of the second area is advantageously less than or equal to a quarter of that of the first area.

The invention also relates to a method for retrieving an image borne by such a recording medium, according to which a) a damaged zone of said image is detected, and b) the values of pixels able to replace the pixels of the damaged zone are extracted from the retrieval data.

Other features and advantages of the present invention will appear upon reading the following description and examining the appended drawing in which:

FIG. 1 is a diagram illustrating the general principle at the base of the recording method according to the present invention, FIGS. 2 to 5 diagrammatically illustrate recording mediums obtained using different embodiments of the method according to the invention, FIG. 6 diagrammatically illustrates another embodiment of this method, adapted to the retrieval of an image that is part of a sequence of animated images, FIG. 7 diagrammatically illustrates part of a recording medium for a sequence of animated images recorded using the method illustrated by FIG. 6, FIGS. 8 and 9 diagrammatically illustrate part of a recording medium obtained using the method according to the invention, bearing operating instructions for the information borne by said medium.

The basic features of the method according to the invention will be described in reference to FIG. 1 of the appended drawing. This figure is a diagrammatic illustration of an image recording medium 1, e.g. of the photographic type, including a first area 2 bearing a pixilated image with visual reading and a second area 3 dedicated to recording retrieval data of said image, this data also being recorded in the form of an array or matrix of pixels. These two areas can advantageously be adjacent. They are, in any case, arranged in a predetermined position relationship making it possible to associate them systematically, this relationship being explained in the operating instructions described in the continuation of this description.

The image borne by the area 2 can be read by simple visual reading or by automatic reading. It can be in color or black and white and may or may not include halftones. For the clarity of the drawing, it is not shown in FIG. 1, which only shows the limits of the various pixels making it up. Likewise, in the area, or image, 3 only the limits of the pixels appear in which the retrieval data is recorded and not the optical, digitized characteristics of these pixels, which are images of retrieval data contained in this area 3. This retrieval data is thus shown by predetermined optical and/or color density levels of the pixels where they are recorded.

According to one important feature of the present invention, to establish this retrieval data, the matrix of pixels making up the image 2 is divided into a mosaic of blocks of pixels such as the block 4. These blocks can be attached or unattached. They are made up of pixels contained in at least two rows and at least two columns of pixels of the image 2.

As an illustrative non-limiting example only, the block 4 shown includes 3×2, or 6 pixels taken in two rows and three columns of the image 2, whereas the image 2 comprises 20×20, or 400 pixels and the area 3 comprises 10×10 pixels. It is clear that the image 2 could include a much larger number of pixels. The small dimensions of the image 2 were only chosen to ensure the clarity of FIG. 1.

Also according to the present invention, calculations are done on the pixels of each block to draw information from these pixels that is representative of the optical characteristics of the pixels of the block, considered in their entirety. These calculations use encoded values of the pixels of the image, as for the pixels of the area 3 of the retrieval data.

This information is then recorded in a pixel 5 on the area 3. Said area can have any shape whatsoever. Advantageously, however, it is more coherent to give it the shape of the associated image and record the information on that area 3 in a position homologous to that of the associated block 4 on the area 2. Thus, if the image 2 undergoes damage in particular affecting the block of pixels 4, the retriever will easily find information in the pixel 5 able to help it retrieve that block of pixels.

In FIG. 1, this information is contained in a single pixel 5 of the area 3. It could as, depending on its richness, occupy several pixels. However, by concentrating it on a single pixel, the surface of the area 3 is advantageously reduced as much as possible, therefore also reducing the surface of the medium allotted to recording the information useful for retrieving the associated image, according to the aforementioned aim of the invention.

Thus the image area 2 shown in FIG. 1 includes 400 pixels whereas the area 3 has 100. The pixels of the two areas being assumed to have the same dimensions, the area 3, containing the retrieval information, or data, then has a surface four times smaller than the image area 2. The increase of the surface of the medium due to the incorporation of image retrieval means according to the invention is then 25%, which is considered reasonable and greatly justified by the interest of the presence of this means on the medium, in particular to ensure the long-term exploitation of the content of the archived documents.

On the medium 1, judicious nesting of pairs of areas 2 and 3 each associated with one of several different images recorded on that same medium may then make it possible to minimize their bulk.

In the area 3, there is one pixel for every 4 pixels of the area 2. The block 4 having 3×2, or 6, pixels, there is geometric overlapping of the blocks over ⅓ of their surface. This overlapping is not necessary, but it is advantageous.

Before describing various ways of calculating the information to be recorded in the area 3 to enable the retrieval of the associated image in the case where it has undergone damage at any point in its history, we recall the constraints posed by such a retrieval. As for that of a classic graphic work such as an old painting, the retriever must have at least a means enabling it to recreate, in the damaged zones, a) the outline of the contours that have disappeared of the various colored areas of the pictorial layer and b) the colors of those areas. The outline of the contours generally determining the semantic content of the image, it is the recreation of the vanished contours that is given priority without, however, neglecting the recreation of the chromatic content of the image.

According to the present invention, the information necessary for this recreation is advantageously recorded when the image itself is recorded. It is indeed when the image is still intact that it is possible to extract reliable and rich information from it regarding its semantic or chromatic content. The extracted information must also concern the entire surface of the image so as to allow a possible subsequent retrieval of any zone of that image.

As will be described in more detail later, image data compression methods are then used, for example, to extract this information from the image still intact, these methods advantageously making it possible to limit the surface of the support dedicated to recording retrieval data.

In the case of a recording medium intended to form an archive that must remain exploitable in the long or very long term, as is the case for that described in the aforementioned French patent application no. 07 58910, the medium may also advantageously include an encoded recording of the retrieval data and a recording, with intuitive visual reading, of the knowledge necessary to implement the means for decoding said data, for reading and automatic exploitation thereof. This patent application provides more details on this point.

FIG. 2 of the appended drawing shows a first embodiment of a recording medium diagrammed in FIG. 1, obtained by a first embodiment of the recording method according to the invention. The area 2 of this medium is covered by a color photographic image I of the Taj Mahal, for example, a famous Indian monument. This image is pixilated in the form of a square matrix with 300×300 pixels. The area 3 is covered with a smaller sketch $I_e$, in black and white, of the image I.

According to the invention, this sketch $I_e$ is obtained by filtering the pixels of the image I. The filtering is done using a matrix operator known by the name Laplace operator, in the following particular expression:

$$\begin{matrix} 0 & -1 & 0 \\ -1 & 4 & -1 \\ 0 & -1 & 0 \end{matrix}$$

To do this, the convolution integer of the matrix of pixels of the image I is done with the filtering matrix shown above, the extremum is determined by block (here made up of 2×2 pixels) and the result is stored by block in a pixel (white or black) of a matrix of pixels recorded on the area 3, the position of this pixel in this matrix being homologous to that of the associated block in the matrix of pixels of the area 2.

For the purposes of the illustration, the contrast of the image $I_e$ obtained has been reversed and thresholded.

By proceeding in this way, this transform advantageously keeps the general appearance of the image, in particular that of the contours of its various elements. Its more reduced format (150×150 pixel matrix) meets the constraint posed above, according to which the surface of the medium dedicated to recording retrieval data of the image I must not, advantageously, exceed 25% of the surface of the medium.

It is clear that the image $I_e$ can be used to retrieve destroyed or disappeared parts of the image I, either through visual reading and interpretation of that image by a human restorer, or by reading and automatic retrieval using software designed to that end.

Other operators extracting contours, such as those by Roberts, Prewitt or Sobel for example, could be used in place of the Laplace operator defined above.

FIG. 3 shows another embodiment of the recording medium according to the invention, in which the image $I_c$ borne by the area 3 is obtained by adding the values of the pixels of each of the blocks of pixels of the image I, or by calculating the average value of those pixels, and recording the value thus calculated in a pixel with a homologous position in the area 3.

Thus, for a block of 2×2 pixels Pij arranged as follows at the intersection of the column i and the row j:

$$\begin{matrix} P00 & P10 \\ P01 & P11 \end{matrix}$$

the sum (P00+P10+P01+P11) is calculated that may be divided by 4 and that is then recorded in the area 3. The image $I_c$ obtained reproduces the original image I, including its colors, compressed in the ratio 4. It can be used, like the image $I_e$, of FIG. 2, upon retrieval of damaged parts of the original image.

Of course, any other formulation of the "sum" type could be used, without going beyond the scope of the present invention. There are examples of this in the embodiments of the medium according to the invention diagrammed in FIGS. 4 and 5. Likewise, blocks of pixels of a higher order, such as 3×3 or 4×4 blocks, for example, could be substituted for the 2×2 block above.

The embodiments of FIGS. 4 and 5 use a data analysis technique, more particularly for image data, known as "wave transform" This technique is currently used in particular in digital image compression algorithms such as the JPEG2000 encoder.

According to this technique, explained below in the simplest known form, from values of the pixels of the block of 2×2 pixels presented above, the values of the following linear combinations of those pixel values are calculated:

$$YdXd=(P00-P10-P01+P11)$$

$$YdXs=(P00+P10-P01-P11)$$

$$YsXd=(P00-P10+P01-P11)$$

$$YsXs=(P00+P10+P01+P11)/4$$

In the names of these linear combinations, the letters d and s relate to sums and differences, respectively. This is how the combination YsXd, for example, shows sums between pixels aligned in a same column (Y axis) and differences between pixels aligned in a same row (X axis).

By transferring, for each combination, its value into a pixel occupying, in an array of such pixels, a position homologous to that of the block of pixels used to calculate that value, four images of "retrieval data" or "sub-images" are obtained.

In FIG. 4, these four sub-images are recorded on the area 2 in place of the original image. The sub-image YsXs is also recorded on the area 3, only as a security double. It could therefore be omitted.

In this case the recording medium does not include any recording of the original image strictly speaking. The four images of retrieval data however make it possible to recreate it in its entirety or only in part, in the event that part corresponds to a damaged zone of one of the four images, for example.

It will be noted that combination YsXs is identical to the sum calculated for the embodiment of FIG. 2. Regarding the images corresponding to other combinations it will be noted that:

the image of the YdXd is sensitive to diagonal transitions,
the image of the YsXd is sensitive to horizontal transitions, and
the image of the YdXs is sensitive to vertical transitions.

The sub-image YsXs is that which bears the main information, in particular the chromatic information. This is why it can be recorded in security double, as indicated above. In the extreme case where only the sub-image YsXs survives damage, the various blocks of the original image can be reconstituted by "expansion" (interpolation or duplication) of the pixels of the sub-image.

Inasmuch as the pixels of a sub-image are missing, the corresponding coefficients are reset during the reconstruction process. In the reconstituted image, the affected block(s) lose spectral content, but the overall image remains intelligible.

The technique for reconstructing an image from sub-images obtained by the wave transform will be explained in more detail below, relative to FIG. 9.

The wave transforms can be the subject of many variations as shown, as a non-limiting illustrative example, in FIG. 5. On the medium illustrated in that figure, the area 2 is occupied by the original image, as in the embodiments of FIGS. 2 and 3. In the area 3 there are four wave transforms that result from a new application of the transform at term YsXs defined above. There is then a medium including a complete original image and its transforms.

As seen above, the information contained in the various embodiments described above of the medium according to the invention can be used by a human or automatic restorer to reconstitute the damaged parts of an original image.

With the embodiment of FIG. 2, for a fixed or isolated image, the sketch will replace the zones of defective or missing pixels. The retriever will repaint these zones in visual coherence in terms of colors, shades and brightness with parts of the image considered to be healthy near these zones.

If the image to be retrieved is part of a sequence of animated images, the sketch can be used as a locking point for block matching, as will be described in the continuation of this description.

With the embodiment of FIG. 3, for which the sum of the pixels of each block is calculated, each damaged block is replaced by the calculated sum, or "checksum," which may be averaged. Moreover, an interpolation from surrounding healthy zones can be iterated until the sums calculated on the replacement blocks are equal to the recorded values.

In the case of an image forming part of a sequence of animated images, an interpolation will be done from the preceding and following images, until the checksums of the replacement blocks reach the stored values.

The embodiment of FIG. 3, with checksums, is particularly interesting to process non-interlaced sub-images as found in video image recordings, for example. The checksum can then directly yield the missing values, by simple arithmetic addition. To that end it is sufficient for the defects affecting the sub-images not to overlap during reconstitution of a complete image.

In the contrary case, interpolations will be iterated between healthy pixels until coherence is found between the calculated checksum and the stored checksum.

With the embodiments of FIGS. 4 and 5, with wave transforms, the complete image is first reconstituted from images of YsXs, YsXd, YdXs, YdXd. The impact of a defect on YsXs is strong, whereas that of a defect on YsXd or YdXs is average and that of a defect on YdXd is low. The image of YsXs is the most critical. This is why it is duplicated in the embodiment of FIG. 4.

If YdXd is affected by a defect, it is practically sufficient to reset the damaged part. The impact, which is low, dissipates inside the equations for reconstructing a block.

If YsXd or YdXs are damaged, they are replaced by a sketch similar to that of the embodiment of FIG. 2, obtained by their simple addition, combined with YdXd. It is then possible to reconstitute the pixels of the various blocks of the image using the following equations:

$$P00=YsXs+YdXs+YsXd+YdXd$$

$$P01=YsXs-YdXs+YsXd-YdXd$$

$$P10=YsXs+YdXs-YsXd-YdXd$$

$$P11=YsXs-YdXs-YsXd+YdXd$$

If the images YiXj combined above are non-interlaced, the retrieval of any one of them must begin with an interpolation, which improves the quality of the result.

Lastly, given the low impact mentioned above of the term YdXd, the image of that term can be eliminated on the recording medium in order to save the surface of that medium. It may also be replaced with an additional image of the term YsXs, to the benefit of an increased redundancy of the most relevant information to be taken into account during the reconstruction of an altered image.

Moreover, as seen relative to FIG. 9, the existence of a fifth data E (the second area) makes it possible to directly recalculate missing terms of a sub-image YiXj. This second area is not necessarily a copy of YsXs provided that the system of equations makes it possible to go back up to the missing terms.

It is known that there is most often a strong redundancy between the contents of adjacent images of a sequence of animated images. This redundancy is also commonly used today to compress video or television image data so they can be recorded on mediums making it possible to distribute those images cost effectively.

Known to this end is an image compression technique proceeding through block matching. This consists of looking, through intercorrelation, for the existence and position of identical or similar blocks of pixels in consecutive images so that the recording of the position and content of such blocks can be used to record at least two consecutive images in the sequence. It will be described below how this technique can be used in the context of the method of recording images and retrieval data for those images according to the present invention, applied to the recording of a sequence of animated images.

FIG. 6 of the appended drawing shows three consecutive images $I_{n-1}, I_n, I_{n+1}$ of such a sequence. The block of pixels $B_n$ of the image $I_n$ has matches $B_{n-1}$ and $B_{n+1}$, respectively, in the adjacent images $I_{n-1}, I_{n+1}$, respectively. In all three blocks one can see part of the corner of the mouth of a same female face. For the clarity of the figures, these blocks are large. In reality they will be smaller blocks having 3×3, 4×4 or even 4×3 pixels, for example.

According to the invention, in the case where the pixels of the block $B_n$ of the image $I_n$ are damaged, this image is restored by replacing said, block with one of the adjacent homologous blocks or with a block resulting from a combination of those blocks, a linear combination, for example in the simplest case.

To that end it is necessary to know the "displacement vectors" $V_{ar}, V_{av}$ of the homologous blocks, from one image to the other. Attached to the image $I_n$ is a vector field from $I_{n-1}$ and that going to $I_{n+1}$. The arrival of a rear vector $V_{ar}$ is locked on the grid, or array, or pixels of $I_n$ while the departure of the front vector $V_{av}$ is also locked on that grid. The same is true for the adjacent images.

It is in this way that:
the arrival of the rear vector coming from $I_{n-1}$ is locked on the grid of blocks of $I_n$. Its departure is indifferent in image $I_{n-1}$.
the departure of the front vector bound for $I_{n+1}$ is locked on the grid of blocks of $I_n$. Its arrival is indifferent in image $I_{n+1}$.
attached to each block $B_n$, is a rear vector and a front vector.
each block $B_n$ also benefits from the front vector of $B_{n-1}$ and the back vector of $B_{n+1}$.
Optimally, a pair of "legitimate" front/rear vectors and a recomposed pair borrowed from the blocks $B_{n-1}$ and $B_{n+1}$ will be used in the calculations.

From this results the existence, for the repair of image $I_n$, of two fields of rear vectors and two fields of front vectors, if only the immediately adjacent images are taken into account. Alternatively, the calculations may also take images $I_{n-2}, I_{n+2}$ and beyond into account. Also alternatively, to save, the calculations may take only the rear vectors or the front vectors into account.

Weight coefficients can advantageously be associated with the different blocks taken into account to calculate a block for replacing a damaged block of the image $I_n$. The mathematical equation making it possible to calculate this block can then assume the form of a linear combination of blocks taken into consideration, weighted by these coefficients.

If it is not possible to determine, for part of the image, a satisfactory repair equation for that block, the following exception strategy may be adopted. The weight coefficients are kept at zero and the image zone in question is duplicated and recorded separately on the medium to potentially serve as repair material.

Before repairing them, it is obviously necessary to detect the existence of defects on an image. According to one possible detection strategy, for each block of an image, correlation calculations are done with, and between, the homologous blocks of adjacent images. Using a decision matrix using the majority rule principle, for example, a decision can be made about whether the considered block of the image $I_n$ is affected by a defect.

When the detection of the defect is certain, the repair is done by replacing the defective block (in part or in whole) with a weighted combination of corresponding blocks taken in the adjacent images.

Thus, according to the variation of the method according to the present invention described above, the displacement vector fields are at the base of the detection and repair of the defects of the image. It will be observed that the determination of these vector fields is done, according to the invention, when there are intact images available to proceed with that determination. Thus, in this alternative as in the others described above, the method according to the invention for recording images at the same time as retrieval data for those images, advantageously makes it possible to conserve, from the beginning and under optimal conditions, the essential parameters of that retrieval.

The recording medium obtained using this method can assume quite varied forms, depending on the needs, which are also quite varied. As an illustrative and non-limiting example only, FIG. 7 of the appended drawing shows an embodiment of such a medium, adapted to record images in CCIR-601/50 Hz format, with 720×576 pixels, on a photographic film 33 mm wide.

Successive surface elements S of such a film can be printed using a writing matrix of 2048×1536 pixels. As illustrated in FIG. 7, such an element S can bear 5 images $I_i$ (i from 1 to 5) in the format defined above in two rows of 2 images $I_1, I_2$ and $I_3, I_4$ separated by 4 aligned areas of retrieval data $V_1$ to $V_4$, the remaining space receiving a fifth image $I_5$ and its related retrieval data area $V_5$.

In the case where the retrieval data has been established using the block matching technique described above, the values of the displacement vectors associated with each block of pixels of the corresponding image $I_i$ are found in a data area $V_i$, in a position homologous to that of said block in the image.

The vectors can be encrypted in a number of different ways, as desired by the person skilled in the art. In any case the operating instructions mentioned above should provide the related rules.

It is in this way that, for example, the coordinates of the homologous block in the image $I_{n-1}$ can be expressed in "absolute" coordinates relative to the upper left corner of said image or in "relative" coordinates relative to the position of the considered block of the image $I_n$.

The surface allotted to each of the retrieval data areas is advantageously equal to only one quarter of that of the associated image, according to one of the aims of the invention stated in the preamble of this description.

In this respect one advantage of the block matching technique will be noted, which lies in the independence between the size of the blocks (2×2, 8×8, 32×32, etc. . . . ) and the vectors. If the block is small (for example 2×2 or 4 pixels), encoding of the vectors over more than 4 pixels will be penalizing in terms of surface of the recording medium used. If, on the contrary, the block is larger (for example 8×8 or 64 pixels), 8 pixels can advantageously be used to encode the vectors because that number is significantly lower than the number of pixels of the block.

It is thus possible to adjust the size of the blocks in order to adapt the available surface on the recording medium. The one quarter rule posited above concerning the space occupied by the retrieval data on that support may be broken if needed.

Going back to FIG. 6, this figure more precisely defines "vector" X1, Y1 or X2, Y2, within the meaning of the present invention. X1, Y1 designates the coordinates of the block $B_{n-1}$ and X2, Y2 designates those of the block $B_{n-1}$ in the pixel matrix of the corresponding image.

To make this data easier to read, each data Xi or Yi is recorded on 4 pixels of the concerned data area. When color photographic film is used for the recording, for example including layers for recording red, green and blue colors, it is possible to encode this data in brightness and record it in the form of optical densities in one of the three layers.

The weight coefficients can then be recorded in one of the other two layers, also in optical densities.

Lastly, the third layer may be dedicated to recording simplified versions of different blocks of pixels, for the case where block matching between the adjacent image blocks fails, as seen above. These simplified versions should advantageously define at least the transition zones between adjacent areas of the image, i.e. the contours of the object illustrated in the image. Indeed, these contours represent the most important part of the semantic content of the image. Their reconstruction makes it easy to retrieve the colors of the areas these contours delimit.

Other arrangements of the retrieval data in the three aforementioned layers are of course possible; in this way "vectors" X1, Y1 could be recorded in one of the three layers with certain weight coefficients, whereas "vectors" X2, Y2 are recorded in another with other weight coefficients.

The strategy for placing images on the surface of the medium S depends on the size, often standardized, of the images. It is in this way that, for example, larger images, e.g. 4096×3072 pixels, could be split into 4 sub-images of the size of the writing matrix. A fifth image, recorded in sequence, then bears the information concerning the displacement vectors.

It is clear, failing standardization, that the recording medium will have to include information making it possible to define, understand and implement the aforementioned operating instructions for the retrieval data incorporated in the medium.

This is particularly the case when this medium constitutes an archive intended to ensure long-or very long-term conservation and accessibility of the recorded information, as is the case of the recording medium described in the aforementioned French patent application no. 07 58910.

These operating instructions will then have to be clearly explained, for example in a header portion of the aforementioned strip of photographic film, in particular using a diagram like that of FIG. 7 reproducing the arrangement of the different image and data areas on a surface element of that film. Advantageously, in particular in the case of an archive intended for very long-term use, several centuries, for example, the presentation of the operating instructions must be such that it makes it possible for a future archivist to understand these operating instructions by simply playing an intuitive visual reading. The aforementioned patent application provides all of the information necessary to produce an archive of this type.

Equivalent operating instructions can be established for recording mediums in which the image retrieval data has been developed using techniques other than block matching, for example using wave transforms as previously described.

FIG. 8 shows a "normal" operating mode in the case of recording of the type shown in FIG. 4, using a wave transform. The page symbolizes the relative placement of the sub-images A, B, C and D on the first area 2 and E on the second area 3 (see box $C_1$) so that a user can recognize it on the archive to be exploited, a strip of photographic film for example.

Figure 1:
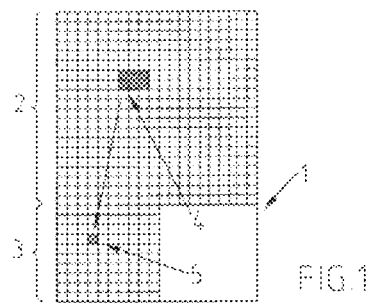
Figure 3:
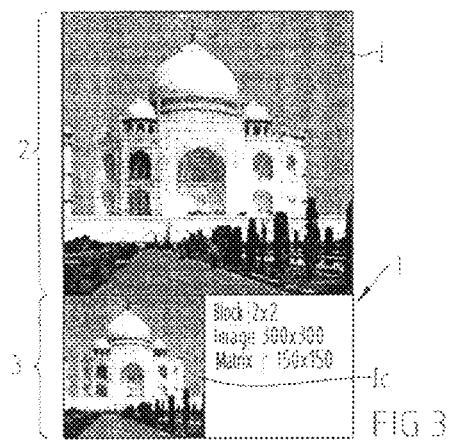
Figure 2:
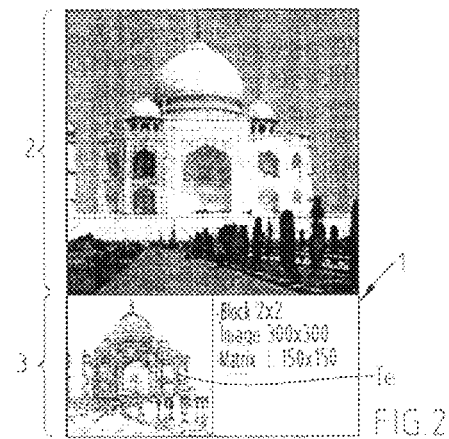
Figure 4:
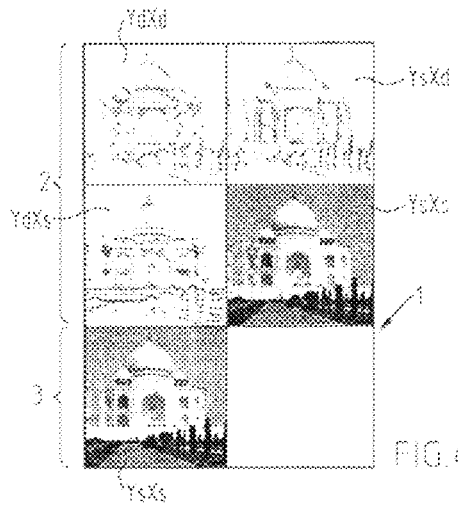
Figure 5:
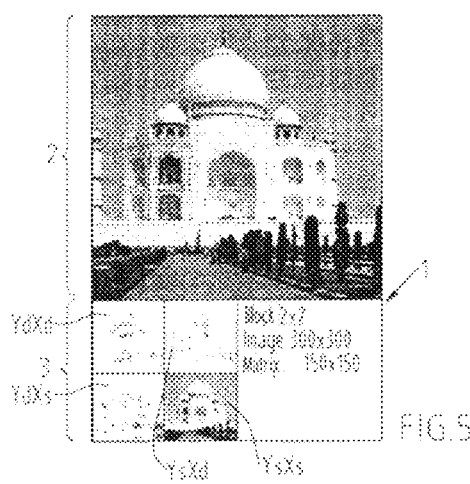
Figure 6:
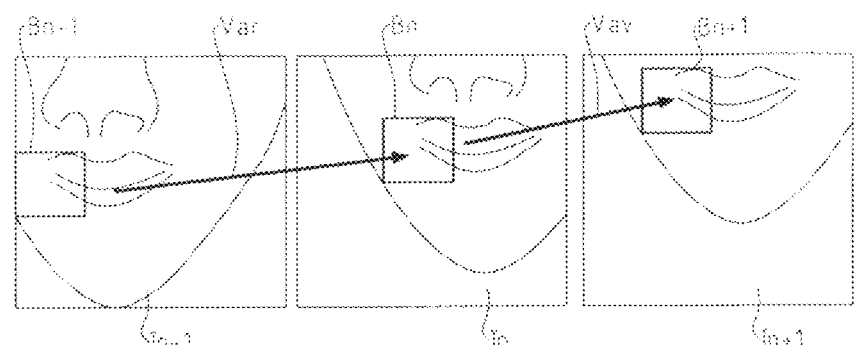
Figure 7:
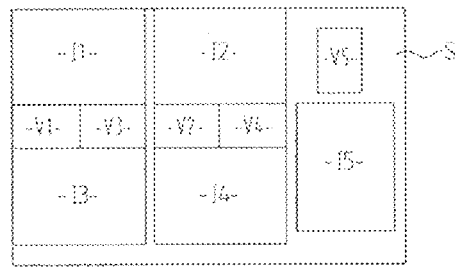
Figures 8, 9:
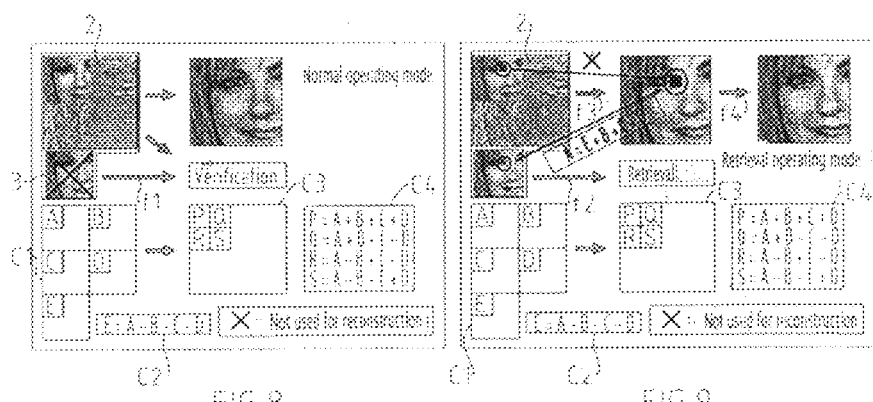
FIGS. 8 and 9 show, as an illustrative and non-limiting example only, two areas of operating instructions able to allow an intuitive understanding of the process of reconstructing the original image (see FIG. 8) from sub-images A, B, C and D obtained by a wave transform of that original image and the repair process of that image in case of damage of one of its sub-images (see FIG. 9).

The page of FIG. 8 shows that the second area 3 (or E) is to be used to verify the reconstruction coherence of the original image. An arrow $f_1$ coming from E points to the term "verification."

For the corresponding pixels of the sub-images A, B, C and D, the equation in box $C_2$ must be verified:

$$E=A-B-C-D$$

The area 3 is then used as checksum to detect the erroneous pixels.

The page of FIG. 8 also illustrates the process of reconstituting original pixels P, Q, R and S (see box $C_3$) by using pixels of the sub-areas A, B, C and D and the following relationships (appearing in the box $C_4$):

$$P=A+B+C+D$$

$$Q=A+B-C-D$$

$$R=A-B+C-D$$

$$S=A-B-C+D$$

FIG. 9 shows another page of the operating instructions entitled "retrieval." It symbolically illustrates the retrieval process according to the invention, in the case where a defect Df affects sub-image A. Feature A crossed out with an X suggests that Df is a defect of that sub-image. Other pages, not shown, could illustrate the case of defects affecting sub-images B, C or D.

An arrow $f_2$ coming from sub-image E points to the term "retrieval" and another arrow $f_3$ points to the defective zone of the reconstituted image in order to prompt the use of the pixels of E to repair the defect.

The damaged pixels of A are replaced by pixels A' calculated using the equation:

$$A'=E+B+C+D$$

Lastly, a last arrow $F_4$ points to the repaired final image.

If it is necessary to illustrate the repair of a defect in sub-images B, C or D, similar pages can be recorded in the archive strip with, depending on the case:

in the case of a defect on B, the equation B'=E−A+C+D
in the case of a defect on C, the equation C'=E−A+B+D
in the case of a defect on D, the equation D'=E−A+B+C It is obvious that operating modes using other symbolic representations aiming to achieve the same result could be substituted for that described above, without going beyond the scope of the present invention.

It now appears that the invention indeed makes it possible to achieve the stated aims, i.e. to produce a medium for recording images incorporating data for retrieving those images that occupy, on the surface of said medium, a reasonably limited space while still constituting a powerful retrieval means, possibly usable very long term when this medium is intended to form an archive. This power results in particular from the development of this retrieval data at a time when the maximum amount of information is available about the content of the images that may need to be restored after damage, i.e. before such damage affects the volume of that information.

Of course the invention is not limited to the described and illustrated embodiments, which have been provided solely as examples. In this way, the image retrieval methods described above as being used separately can be combined. It would thus be possible to associate an image with a first data area developed from checksums and a second data area from the block matching technique.

Lastly, the image retrieval method according to the invention described above can be used for images other than those fixed on a medium where they are visible, for example images recorded in the form of digital files on mediums such as "solid state" memory, magnetic memory, or digital optical discs.

Indeed, this method can then be used to reconstitute pixels missing from the pixel mosaic recorded on such a medium. The principle of the computer processing method would be identical to that described above.

It will, however, be observed that the form in which a file is recorded on a computer medium includes marks so that the program that knows those marks can put the recorded data back in the appropriate order. If the marks are altered or illegible, reconstitution becomes practically impossible.

The use of a photographic film makes it possible to escape this drawback when the data is recorded on the film in its placement order. The mosaic of pixels making up an image remains formed and an alteration of certain zones of the film does not challenge that order.

The invention claimed is:

1. A method of recording images and data for retrieving said images, each of said images assuming the form of a two-dimensional array of rows and columns of pixels, wherein to develop and record the retrieval data, the image is divided into blocks of pixels, each block comprising pixels of at least two rows and two columns, retrieval data is calculated for each block from at least the image data contained in the pixels of that block, and said retrieval data of the block is recorded in the form of at least one pixel having a value as a function of said retrieval data, wherein the image and the retrieval data are recorded on first and second areas of a recording medium, respectively, said areas being arranged in a predetermined relative position relationship, and wherein, to calculate the retrieval data, the convolution integral of the values of the pixels of each block is done with a filtering operator, the extremum is calculated by block, and the retrieval data thus calculated is recorded on the second area in a homologous position of the corresponding block of pixels of the image recorded on the first area.

2. The method according to claim 1, wherein said filtering operator is chosen such that the second area has an image of element contours homologous to those of elements of the image borne by the first area.

3. The method according to claim 1, wherein images of operating instructions of said retrieval data are also recorded on the medium.

4. The method according to claim 3, wherein said operating instructions use visual reading.

5. The method according to claim 3, wherein said operating instructions use automatic reading.

6. A medium for recording images resulting from the implementation of the method according to claim 1, including at least one area bearing retrieval data of an image assuming the form of an array of rows and columns of pixels, wherein said retrieval data is recorded in the form of a second array of pixels each having an optical characteristic as a function of retrieval data calculated from image data contained in one of said blocks of pixels resulting from the division of the pixilated image, and wherein said image and said retrieval data are recorded on first and second areas of the medium, respectively, these areas being arranged in a predetermined relative position relationship.

7. The medium according to claim 6, wherein the area of the surface of the second area is advantageously less than or equal to a quarter of that of the first area.

8. A method for retrieving an image borne by a recording medium according to claim 6, wherein a) a damaged zone of said image is detected, and b) the values of pixels able to replace the pixels of the damaged zone are extracted from the retrieval data.

9. A method of recording images and data for retrieving said images, each of said images assuming the form of a two-dimensional array of rows and columns of pixels, wherein to develop and record the retrieval data, the image is divided into blocks of pixels, each block comprising pixels of at least two rows and two columns, retrieval data is calculated for each block from at least the image data contained in the pixels of that block, and said retrieval data of the block is recorded in the form of at least one pixel having a value as a function of said retrieval data, wherein the image and the retrieval data are recorded on first and second areas of a recording medium, respectively, said areas being arranged in a predetermined relative position relationship, and wherein, to calculate the retrieval data, at least one optical characteristic of the pixels of each of said blocks is measured, said optical characteristics thus measured are added, and at least one pixel having the sum optical characteristic thus calculated is recorded on the second area in a position homologous to that of the block of corresponding pixels of the image recorded on the first area.

10. A medium for recording images resulting from the implementation of the method according to claim 9, including at least one area bearing retrieval data of an image assuming the form of an array of rows and columns of pixels, wherein said retrieval data is recorded in the form of a second array of pixels each having an optical characteristic as a function of retrieval data calculated from image data contained in one of said blocks of pixels resulting from the division of the pixilated image, and wherein said image and said retrieval data are recorded on first and second areas of the medium, respectively, these areas being arranged in a predetermined relative position relationship.

11. A method of recording images and data for retrieving said images, each of said images assuming the form of a two-dimensional array of rows and columns of pixels, wherein to develop and record the retrieval data, the image is divided into blocks of pixels, each block comprising pixels of at least two rows and two columns, retrieval data is calculated for each block from at least the image data contained in the pixels of that block, and said retrieval data of the block is recorded in the form of at least one pixel having a value as a function of said retrieval data, wherein, to calculate the retrieval data, a wavelet transform is applied to said image from measurements of at least one optical characteristic of the pixels of each of said blocks and at least one of the retrieval data images resulting from said transform is recorded.

12. The method according to claim 11, wherein said transform is reiterated on at least one of the images resulting from the first transform and at least one of the images resulting from the second transform is recorded.

13. The method according to claim 12, wherein said image and said retrieval data are recorded on first and second areas of a recording medium, respectively, said areas being arranged in a predetermined relative position relationship.

14. A medium for recording images resulting from the implementation of the method according to claim 12, including at least one area bearing retrieval data of an image assuming the form of an array of rows and columns of pixels, wherein said retrieval data is recorded in the form of a second array of pixels each having an optical characteristic as a function of retrieval data calculated from image data contained in one of said blocks of pixels resulting from the division of the pixilated image, and wherein said image and said retrieval data are recorded on first and second areas of the medium, respectively, these areas being arranged in a predetermined relative position relationship.

15. The method according to claim 11, wherein a plurality of retrieval data imagesresulting from the wave transform are recorded on a recording medium.

16. A medium for recording images resulting from the implementation of the method according to claim 11, including at least one area bearing retrieval data of an image assuming the form of an array of rows and columns of pixels, wherein said retrieval data is recorded in the form of a second array of pixels each having an optical characteristic as a function of retrieval data calculated from image data contained in one of said blocks of pixels resulting from the division of the pixilated image, and wherein said image and said retrieval data are recorded on first and second areas of the medium, respectively, these areas being arranged in a predetermined relative position relationship.

17. A method of recording images and data for retrieving said images, each of said images assuming the form of a two-dimensional array of rows and columns of pixels, wherein to develop and record the retrieval data, the image is divided into blocks of pixels, each block comprising pixels of at least two rows and two columns, retrieval data is calculated for each block from at least the image data contained in the pixels of that block, and said retrieval data of the block is recorded in the form of at least one pixel having a value as a function of said retrieval data, wherein the image and the retrieval data are recorded on first and second areas of a recording medium, respectively, said areas being arranged in a predetermined relative position relationship, and the method is applied to an image that is part of a sequence of animated images, wherein movement vectors of the homologous blocks of these images are calculated from the content of the blocks of at least two consecutive images of said sequence and the components of said vectors are recorded on a second area, in a position homologous to that of said block in the associated image.

18. The method according to claim 17, wherein weights of terms of a linear combination of blocks are also recorded on said medium making it possible to calculate a replacement block for a damaged block of an image recorded on the medium.

19. The method according to claim 18, wherein simplified expressions of the blocks of an image are also recorded on the medium, and can be substituted for the corresponding block when the calculation of said replacement block is impossible.

20. The method according to claim 19, applicable to a color photographic recording medium, wherein the recordings of the vectors, weights and simplified expressions of said blocks are distributed in recording layers of different colors of said medium.

* * * * *